US005578185A

United States Patent [19]
Bergeron et al.

[11] Patent Number: 5,578,185
[45] Date of Patent: Nov. 26, 1996

[54] METHOD FOR CREATING GATED FILAMENT STRUCTURES FOR FIELD EMISION DISPLAYS

[75] Inventors: David L. Bergeron, San Jose; John M. Macaulay; Roger W. Barton, both of Palo Alto; Jeffrey D. Morse, Martinez, all of Calif.

[73] Assignee: Silicon Video Corporation, Cupertino, Calif.

[21] Appl. No.: 383,408

[22] Filed: Jan. 31, 1995

Related U.S. Application Data

[63] Continuation-in-part of Ser. No. 260,150, Jun. 29, 1994, Pat. No. 5,541,957, which is a continuation-in-part of Ser. No. 158,102, Nov. 24, 1993, which is a continuation-in-part of Ser. No. 118,490, Sep. 8, 1993, Pat. No. 5,462,467.

[51] Int. Cl.$^6$ .................................................. C25D 5/02
[52] U.S. Cl. ............................ 205/123; 313/309; 445/50
[58] Field of Search ........................... 205/123; 313/309; 445/50

[56] References Cited

U.S. PATENT DOCUMENTS

| 3,303,085 | 2/1967 | Price et al. | |
|---|---|---|---|
| 3,407,125 | 10/1968 | Fehlner | 204/20 |
| 3,497,929 | 3/1970 | Shoulders et al. | 29/25.17 |
| 3,562,881 | 2/1971 | Barrington et al. | 29/25.18 |
| 3,665,241 | 5/1972 | Spindt et al. | 313/309 |
| 3,755,704 | 8/1973 | Spindt et al. | 313/309 |
| 4,008,412 | 2/1977 | Yuito et al. | 313/309 |
| 4,163,949 | 8/1979 | Shelton | 313/309 |

(List continued on next page.)

FOREIGN PATENT DOCUMENTS

| 0351110A1 | 1/1990 | European Pat. Off. . |
| 0416625A2 | 3/1991 | European Pat. Off. . |
| 0508737A1 | 10/1992 | European Pat. Off. . |
| 92/02030 | 2/1992 | WIPO . |
| 93/18536 | 9/1993 | WIPO . |

OTHER PUBLICATIONS

Melmed, "The art and science and other aspects of making sharp tips", *J. Vac. Sci. Technol. B.*, vol. 9, No. 2, pp. 601–608, Mar./Apr. 1991.

Busta, "Vacuum Microelectronics—1992" *J. Micromech. Microeng.*, vol. 2, pp. 43–74, (1992).

Utsumi, "Keynote Address, Vacuum Microelectronics: What's New & Exciting", *IEEE Trans. Elect. Dev.*, pp. 2276–2283, Oct. 1990.

Fischer et al., "Production & Use of Nuclear Tracks: Imprinting Structure on Solids", *Rev. Mod. Phys.*, pp. 907–948, Oct. 1993.

Spindt et al., "Research in Micron–Size Field Emission Tubes", Stanford Research Institute, Menlo Park, CA, *IEEE Conference Record of 1966 8th Conference on Tube Techniques*, pp. 143–147, Sep. 1966.

Arai et al., "Magnetic Properties of Iron Electro–Deposited Alumite Films", *IEEE Transactions on Magnetics*, vol. MAG–23, No. 5, pp. 2245–2247, Sep. 1987.

(List continued on next page.)

Primary Examiner—Kathryn Gorgos
Assistant Examiner—Kishor Mayekar
Attorney, Agent, or Firm—Wilson Sonsini; Goodrich & Rosati

[57] ABSTRACT

A method is provided for creating gated filament structures for a field emission display. A multi-layer structure is provided that includes a substrate, an insulating layer, a metal gate layer positioned on a top surface of the insulating layer and a gate encapsulation layer positioned on a top surface of the metal gate layer. A plurality of gates are provided and define a plurality of apertures on the top of the insulating layer. A plurality of spacers are formed in the apertures at their edges on the top surface of the insulating layer. The spacers are used as masks for etching the insulating layer and form a plurality of pores in the insulating layer. The pores are plated with a filament material to create a plurality of filaments. The pores can be overplated to create the plurality of filaments. The filaments are vertically self-aligned in the pores.

36 Claims, 5 Drawing Sheets

U.S. PATENT DOCUMENTS

| | | | |
|---|---|---|---|
| 4,338,164 | 7/1982 | Spohr | 204/4 |
| 4,345,181 | 8/1982 | Shelton | 313/309 |
| 4,668,957 | 5/1987 | Spohr | 343/812 |
| 4,732,646 | 3/1988 | Elsmer et al. | 156/626 |
| 4,940,916 | 7/1990 | Borel et al. | 313/309 |
| 5,007,873 | 4/1991 | Goronkin et al. | 445/49 |
| 5,019,003 | 5/1991 | Chason | 313/309 |
| 5,053,673 | 10/1991 | Tomii et al. | 313/309 |
| 5,129,850 | 7/1992 | Kane et al. | 313/309 |
| 5,141,460 | 8/1992 | Jaskie et al. | 313/309 |
| 5,142,184 | 8/1992 | Kane | 313/309 |
| 5,150,019 | 9/1992 | Thomas et al. | 313/309 |
| 5,150,192 | 9/1992 | Greene et al. | 313/309 |
| 5,151,061 | 9/1992 | Sandhu | 313/309 |
| 5,164,632 | 11/1992 | Yoshida et al. | 313/309 |
| 5,170,092 | 12/1992 | Tomii et al. | 313/309 |
| 5,188,977 | 2/1993 | Stenel et al. | 313/309 |
| 5,194,780 | 3/1993 | Meyer | 313/309 |
| 5,199,917 | 4/1993 | MacDonald et al. | 313/336 |
| 5,199,918 | 4/1993 | Kumar | 445/50 |
| 5,202,571 | 4/1993 | Hirabayashi et al. | 313/446 |
| 5,211,707 | 5/1993 | Ditchek et al. | 445/24 |
| 5,249,340 | 10/1993 | Kane et al. | 29/25.02 |
| 5,252,833 | 10/1993 | Kane et al. | 250/423 F |
| 5,277,638 | 1/1994 | Lee | 445/24 |
| 5,278,475 | 1/1994 | Jaskie et al. | 313/308 |
| 5,342,808 | 8/1994 | Brigham et al. | 437/228 |
| 5,430,347 | 7/1995 | Kane et al. | 313/309 |
| 5,458,520 | 10/1995 | DeMercurio et al. | 445/05 |

OTHER PUBLICATIONS

Betsui, "Fabrication and Characteristics of Si Field Emitter Arrays", *Technical Digest IVMC 91*, pp. 26–29, (1991). No month available.

Chakarvarti et al., "Microfabrication of metal–semiconductor heterostructures and tubules using nuclear track filters", *J. Micromech. Microeng.*, vol. 3, pp. 57–59, (1993). No month available.

Chakarvarti et al., "Morphology of etched pores and microstructures fabricated from nuclear track filters", *Nucl. Instr. & Meth. Phys. Res.*, pp. 109–115 (1991). No month available.

Cochran et al., "Low–voltage field emission from tungsten fiber arrays in a stabilized zirconia matrix", *J. Mater Res.*, vol. 2, No. 3, pp. 322–328, May/Jun. 1987.

Hill et al., "A Low Voltage Field Emitter Array Cathode for High Frequency Applications", Abstract 6.5, 5th Int'l Vac. Microelecc. Conf., Jul. 13–17, 1992.

Kirkpatrick et al., "Vacuum field emission from a Si–TaSl2 semiconductor–metal eutectic composite", *Appl. Phys. Lett.*, vol. 59, No. 17, pp. 2094–2096, Oct. 21, 1991.

Penner et al, "Preparation and Electrochemical Characterization of Ultramicroelectrode Ensembles," *Analytical Chemistry*, vol. 59, No. 21, pp. 2625–2630, Nov. 1, 1987.

Possin, "A Method for Forming Very Small Diameter Wires", *Rev. Sci. Instrum.*, vol. 41, pp. 772–774, (1970). No month available.

Shiraki et al., "Perpendicular Magnetic Media by Anodic Oxidation Method and Their Recording Characteristics", *IEEE Trans. Mags.*, vol. MAG–21, No. 5, pp. 1465–1467, Sep. 1985.

Spohr, *Ion Tracks and Microtechnology, Principles and Applications*, (Viewig), edited by K. Bethge, pp. 246–255, (1990). No month available.

Sune et al., "Fabrication of Silicon–Column–Field Emitters for Microwave Applications", *Technical Digest. Sixth International Vacuum Microelectronics Conference*, pp. 15–16, Newport RI, Jul. 12–15, 1993.

Tsuya et al., "Alumite Disc Using Anordic Oxidation (invited)", *IEEE Transactions on Magnetics*, vol. MAG–22, No. 5, pp. 1140–1145, Sep. 1986.

Williams et al., "Fabrication of 80 Å metal wires", *Rev. Sci. Instrum*, vol. 55, No. 3, pp. 410–412, Mar. 1984.

Whitney et al., "Fabrication and Magnetic Properties of Arrays of Metallic Nanowires", *Science*, vol. 261, pp. 1316–1319, Sep. 3, 1993.

METHOD FOR CREATING GATED FILAMENT STRUCTURES FOR FIELD EMISION DISPLAYS

CROSS-REFERENCE TO RELATED APPLICATIONS

This application is a continuation-in-part of U.S. patent application Ser. No. 08/260,150 entitled "Field-Emitter Fabrication Using Charged-Particle Tracks, And Associated Field-Emission Devices" by Spindt et al., filed Jun. 29, 1994, now U.S. Pat. No. 5,541,957 which is a continuation-in-part of U.S. patent application Ser. No. 08/158,102 entitled "Field-Emitter Fabrication Using Charged-Particle Tracks, And Associated Field-Emission Devices" by Spindt et al., filed Nov. 24, 1993, which is a continuation-in-part of U.S. patent application Ser. No. 08/118,490 entitled "Structure And Fabrication Of Filamentary Field-Emission Device, Including Self-Aligned Gate" by Macaulay et al., filed Sep. 8, 1993, now U.S. Pat. No. 5,462,467 all of which are incorporated herein by reference. This application is related to copending U.S. patent application Ser. No. 08/308,410 entitled "Gated Filament Structures For A Field Emission Display" by Macaulay et al., filed Jan. 31, 1995, and U.S. patent application Ser. No. 08/308,409 entitled "Method For Creating Gated Filament Structures For Field Emission Displays" by Bergeron et al., filed Jan. 31, 1995.

BACKGROUND OF THE INVENTION

1. Field of Use

This invention relates to methods of forming gated filament structures for a field emission display where there are nonuniformities in the thickness of the insulating layer or in plating, and more particularly, to methods using particle tracking to define apertures, spacers as etch masks to form filaments between top planes and bottom planes of associated gate structures, and using the gate structures to define the position of the filament tips.

2. Description of the Related Art

Field emission displays include a faceplate, a backplate and connecting walls around the periphery of the faceplate and backplate, forming a sealed vacuum envelope. In some field emission displays, the envelope is held at vacuum pressure, which can be about $1\times10^{-7}$ torr or less. The interior surface of the faceplate is coated with light emissive elements, such as phosphor or phosphor patterns, which define an active region of the display. Field emission cathodes, such as cones and filaments, are located adjacent to the backplate. Application of an appropriate voltage at the extraction electrode releases electrons which are accelerated toward the phosphors on the faceplate. The accelerated electrons strike their targeted phosphors, causing the phosphors to emit light seen by the viewer at the exterior of the faceplate. Emitted electrons for each of the sets of emitters are intended to strike only certain targeted phosphors.

A variety of methods for forming field emitters are known.

U.S. Pat. No. 3,655,241 discloses fabricating field emitters using a screen with arrays of circular or square openings that is placed above a substrate electrode. A deposition is performed simultaneously from two sources. One of the sources consists of an emitter-forming metal, such as molybdenum, and atoms are deposited in a direction perpendicular to the substrate electrode. The other source consists of a closure material, such as a molybdenum-alumina composite. Atoms of the closure material are caused to impinge on the screen at a small angle to the substrate. The closure material progressively closes the openings in the screen. Thus the emitter-forming metal is deposited in the shape of cones or pyramids, depending on whether the screen openings are circular or square.

Another method of creating field emitters is disclosed in U.S. Pat. No. 5,164,632. Part of an aluminum plate is anodically oxidized to create a thin alumina layer having pores that extend nearly all the way through the alumina. An electrolytic technique is used to fill the pores with gold for the field emitters. An address line is formed over the filled pores along the alumina side of the structure, after which the remaining aluminum and part of the adjoining alumina are removed along the opposite side of the structure to re-expose the gold in the pores. Part of the re-exposed gold is removed during an ion-milling process utilized to sharpen the field emitters. Gold is then evaporatively deposited onto the alumina and partly into the pores to form the gate electrode.

Field emitters are fabricated in U.S. Pat. No. 5,150,192 by creating openings partway through a substrate by etching through a mask formed on the bottom of the substrate. Metal is deposited along the walls of the openings and along the lower substrate surface. A portion of the thickness of the substrate is removed along the upper surface. A gate electrode is then formed by a deposition/planarization procedure. Cavities are provided along the upper substrate surface after which the hollow metal portions in the openings are sharpened to complete the field emitter structures.

However, large area field emission displays require a relatively strong substrate for supporting the field emitters extending across the large emitter area. The requisite substrate thickness is typically several hundred microns to 10 mm or more.

The fabrication methods in U.S. Pat. Nos. 5,164,632 and 5,150,192 make it very difficult to attach the field emitters to the substrates of thickness required for large area displays.

In U.S. Pat. No. 4,940,916, a gated area field emitter consists of cones formed on a highly resistive layer that overlies a highly conductive layer situated on an electrically insulating supporting structure. For a thickness of 0.1 to 1 microns, the highly resistive layer has a resistivity of $10^4$ to $10^5$ ohm-cm. The resistive layer limits the currents through the electron-emissive cones so as to protect the field emitter from breakdown and short circuits.

It is desirable to have uniformity of emission from the cathodes. A field emission cathode relies on there being a very strong electric field at the surface of a filament or generally on the surface of the cathode. Creation of the strong field is dependent on, (i) the sharpness of the cathode tip and (ii) the proximity of the extraction electrode (gate) and the cathode. Application of the voltage between these two electrodes produces the strong electric field. Emission nonuniformity is related to the nonuniformity in the relative positions of the emitter tip and the gate. Emission nonuniformity can also result from differences in the sharpness of the emitting tips.

Busta, "Vacuum Microelectronics-1992," *J. Micromech. Microeng*, Vol. 2, 1992 pp. 43–74 provides a general review of field-emission devices. Among other things, Busta discusses Utsumi, "Keynote Address, Vacuum Microelectronics: What's New and Exciting," *IEEE Trans. Elect. Dev.*, Oct. 1990, pp. 2276–2283, who suggests that a filament with a rounded end is the best shape for a field emitter. Also of interest is Fischer et al., "Production and Use of Nuclear Tracks: Imprinting Structure on Solids," *Rev. Mod. Phys.*, Oct. 1983, pp. 907–948, which deals with the use of charged-particle tracks in manufacturing field emitters according to a replica technique.

A well collimated source of evaporant, as disclosed in U.S. Pat. No. 3,655,241, is necessary in order to obtain uniformity of cone or filament formation across the entire field emission display. In order to maintain a collimated source, the majority of evaporant is deposited on interior surfaces of the evaporation equipment. The combination of the expensive of the evaporation equipment, and the wastage of evaporant, is undesirable for commercial manufacturing and is compounded as the size of the display increases.

It would be desirable to provide a commercial manufacturing process suitable for large area field emission displays. The commercial viability of this process is due to (i) use of electroplating, in combination with a self alignment method that accommodates for nonuniformities and (ii) the use of spacers as both etch masks and as a part of a mold for plating filament structures.

It would be desirable to provide a commercial manufacturing process suitable for large area field emission displays where there are nonuniformities in the thickness of the insulating layer or in plating. The commercial viability of this process is due to (i) use of electroplating, in combination with a self alignment method that accomodates for nonuniformities and (ii) the use of spacers as both etch masks and as a part of a mold for plating filament structures.

SUMMARY

Accordingly, it is an object of the invention to provide a commercial manufacturing process for forming filaments in a large field emission display where there are nonuniformities in the thickness of the insulating layer or in plating.

Another object of the invention is to provide a commercial manufacturing process for forming filaments in a large field emission display using electroplating in combination with self alignment in order to accommodate for nonuniformities in the thickness of the insulating layer or in plating.

Still a further object of the invention is to provide a method for forming filaments in a field emission display which uses spacers as an etch mask.

It is another object of the invention to provide a method of making filament structures in a large area field emission display using particle tracking to define apertures, and spacer technology, along with reactive ion etching, to define the pore where the filament is formed.

A further object of the invention is to provide a method of forming filament structures where the filament structures are plated above associated gates.

Another object of the invention is to provide a method of forming filament tips to establish a relationship between each filament and its associated aperture, with each relationship being substantially the same for all of the filaments of the display.

Another object of the invention is to provide a method for forming filaments in a field emission display which uses the gate to define where the filament tip will be.

A further object of the invention is to provide a method of forming filaments for a field emission display that uses the gate to define the position of the filament tip.

These and other objects of the invention are achieved in a method for creating gated filament structures in a field emission display. A multi-layer structure is provided that includes a substrate, an insulating layer, a metal gate layer, positioned on a top surface of the insulating layer and a gate encapsulation layer positioned on a top surface of the metal gate layer. A plurality of gates are provided and define a plurality of apertures on the top of the insulating layer. A plurality of spacers are formed in the apertures at their edges on the top surface of the insulating layer. Spacers are used as masks for etching the insulating layer and forming a plurality of pores in the insulating layer. The pores are plated with a filament material to create a plurality of filaments.

The multi-layer structure can further include, a metal row electrode positioned on a top surface of the substrate, a resistive layer at least partially positioned on a top surface of the metal row electrode, with the insulating layer position on a top surface of the resistive layer, and a tracking resist layer positioned on a top surface of the gate encapsulation layer.

The multi-layer structure is irradiated with charged energy articles to produce a plurality of tracks in the tracking resist layer. An electrochemical cell is established with gates serving as cathode, and a filament associated with a gate serving as an anode. Filament tips are formed for each filament of the display to establish a relationship between each filament and its associated aperture, with each relationship being substantially the same for at least 50% of the filaments, preferably for at least 75% of the filaments, and more preferably for at least 90% of the filaments.

In another embodiment of the invention, the pores are overplated with a filament material, creating a plurality of filaments.

The methods of the present invention are particularly suitable when there are nonuniformities in the thickness of the insulating layer or in plating. The present invention is suitable for large field emission displays. The gate is used to define the position of the filament, as well as the geometry of the filament tip. The tip is located at the gate. Tracking and etching of the tracks are not used. Instead, tracking defines the apertures. Spacer technology is used with reactive ion etching to define the plurality of insulating pores.

DETAILED DESCRIPTION OF THE PREFERRED EMBODIMENTS

For purposes of this disclosure, a large area field emission display is defined as having at least a 6 inch diagonal screen, more preferably at least an 8 inch diagonal screen, yet more preferably at least a 10 inch diagonal screen, and still more preferably at least a 12 inch diagonal screen.

The ratio of length to maximum diameter of a filament is at least 2, and normally at least 3. The length-to-maximum-diameter ratio is preferably 5 or more.

Figure 1:
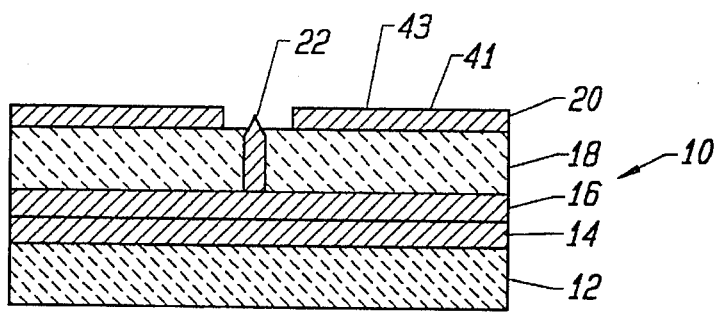
FIG. 1 is a cross-sectional view of a multi layer structure with a gated filament in an insulating pore.

A gated filament structure 10 is created, as illustrated in FIG. 1, from a multi-layer structure which includes a substrate 12, a metal row electrode 14, a resistive layer 16 on top of row electrode 14, an insulating layer 18 on a top surface of resistive layer 16, a metal gate layer 20, and a filament 22 in an insulating pore. Insulating layer 18 is positioned between substrate 12 and metal gate layer 20. It will be appreciated that insulating layer 18 is positioned adjacent to substrate 12 and there can be additional layers between insulating layer 18 and substrate 12 in this adjacent relationship. Thus, adjacent is used herein to mean one layer on top of another layer as well as the possibly of adjacent layers can have intervening layers between them. A portion of insulating layer 18 adjacent to filament 22 has been removed. Filaments are typically cylinders of circular transverse cross section. However, the transverse cross section can be somewhat non-circular. The insulating pore is formed with spacers and reactive ion etching. For definitional purposes, substrate means, (i) a conductive or semi-conductive substrate with an insulating layer on a top surface of the substrate, (ii) a conductive or semiconductive substrate with patterned insulating regions or (iii) an insulating substrate.

Figure 2:
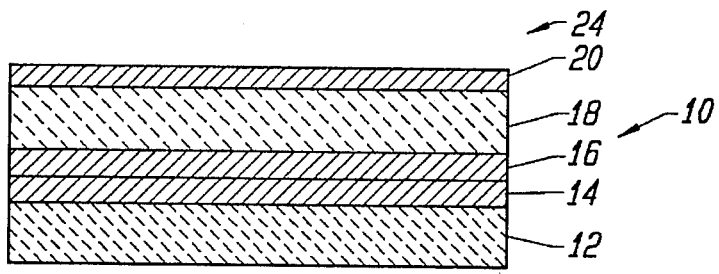
FIG. 2 is a cross-sectional view of an initial multi-layer structure used to create the gated filaments.

Referring now to FIG. 2, the initial multi-layer structure also includes a tracking resist layer 24 positioned on a top surface of metal gate 20.

Suitable materials for the multi-layer structure include the following:

substrate 12—glass or ceramic metal row electrode 14—Ni resistive layer 16—cermet, $CrO_x$ or SiC insulating layer 18—$SiO_2$ metal gate layer 20—Cr and/or Mo tracking resist layer 24—polycarbonate filament 22—Ni or Pt Multi-layer structure of FIG. 1 can be irradiated with energetic charged particles, such as ions, to produce charged particle tracks in tracking resist layer 24. Alternatively, other methods, such as the use of spheres, can be used in place of charged particle tracks to create the gate, as disclosed by Spindt et al., "Research in Micron-Size Field-Emission Tubes", *IEEE Conference Record of* 1966 *Eighth Conference on Tube Techniques*, September 1966 pp. 143–147, incorporated herein by reference.

The other methods include but are not limited to conventional lithography, such as photolithography, x-ray lithography and electron beam lithography.

When charged particles are used, they impinge on tracking resist layer 24 in a direction that is substantially perpendicular to a flat lower surface of substrate 12, and therefore are generally perpendicular to tracking resist layer 24. The charged particles pass through tracking resist layer 24 in a straight path creating a continuous damage zone along the path. Particle tracks are randomly distributed across the multi-layer structure with a well defined average spacing. The track density can be as much as $10^{11}$ tracks/$cm^2$. A typical value is $10^8$ tracks/$cm^2$, which yields an average track spacing of 1 micron.

In one embodiment, a charged particle accelerator forms a well collimated beam of ions which are used to form tracks. The ion beam is scanned uniformly across tracking resist layer 24. A preferred charged particle species is ionized Xe with an energy typically in the range of about 4 MeV to 16 MeV. Alternatively, charged particle tracks can be created from a collimated source of nuclear fission particles produced, for example, by the radioactive element Californium 252.

Figure 3:
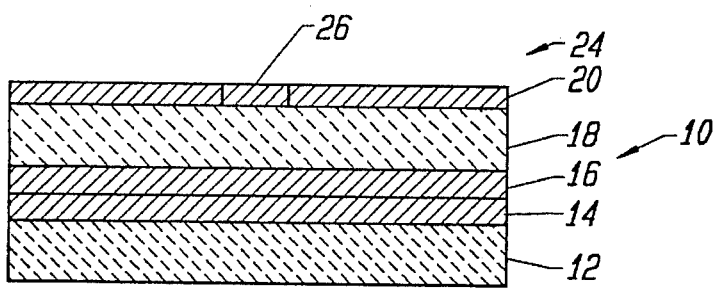
FIG. 3 is a cross-sectional view of the structure of FIG. 2, after the tracking resist layer has been etched to open up an aperture at the gate.
Figure 4:
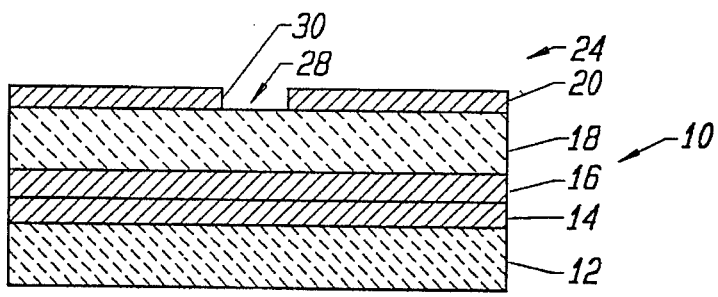
FIG. 4 is a cross-sectional view of the structure of FIG. 3 following reactive ion etching of the metal gate, layer and the creation of gates and apertures.

Once the particle tracks have been formed, a chemical etch, including but not limited to KOH or NaOH, etches and can over-etch the track formed in tracking resist layer 24 (FIG. 3). Instead of forming a cylindrical pore etched along the track, it is widened to open up an aperture 26 in tracking resist layer 24 that is conical with a generally trapezoidal cross-section. Aperture 26 has a diameter of about 50 to 1000 nm, such as by way of example 200 nm, at gate layer 20. Tracking resist layer 24 is used as a mask to etch gate layer 20 to produce, in one embodiment a 200 nm diameter gate hole 28 (FIG. 4). The etching can be reactive ion etching such as $Cl_2$ for Cr and $SF_6$ for Mo. The depth of reactive ion etching into insulating layer 18 is minimized. A variety of mechanisms are available to ensure that the reactive ion etching stops at insulating layer 18 including but not limited to, monitoring the process and stopping it at the appropriate time, the use of feedback devices, such as sensors, and use of a selective etch. Excess tracking resist 24 material is stripped away, leaving a gate 30 on the top of insulating layer 18.

Figure 5A:
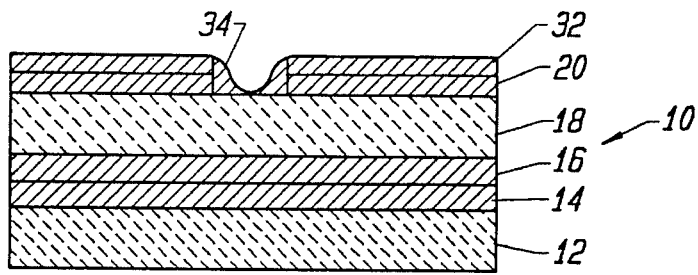
FIG. 5(a) is a cross-sectional view of the structure of FIG. 4 with a conformal layer applied over the gates and into the apertures.

Referring now to FIG. 5(a), a conformal layer 32 is applied on top of gates 30 and into apertures 28. Suitable materials for conformal layer 32 include but are not limited to silicon nitride, amorphous or small grained polycrystalline Si, and $SiO_2$. Methods for applying conformal layer include but are not limited to CVD.

Figure 5B:
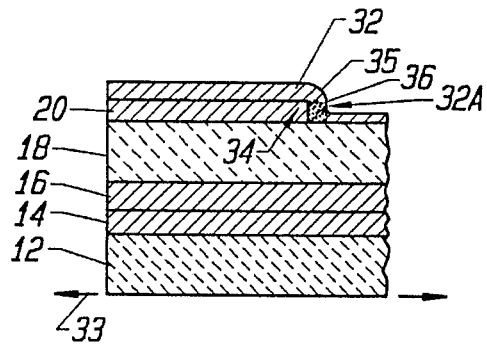
FIG. 5(b) is a cross-sectional view of the structure of FIG. 5(a) when conforming layer 32 is anisotropicaly etched and material is removed. The anisotropic etching step removes the material, thus forming a spacer at a step.

As shown in FIG. 5(b) when conforming layer 32 is anisotropicaly etched material is removed. Material is removed from conformal layer 32 at surfaces which are parallel to a plane 33 defined by insulating substrate 12, e.g., surface 35 is not etched. The anisotropic etching step removes the material, thus forming a spacer 36 at a step 34.

Figure 6:
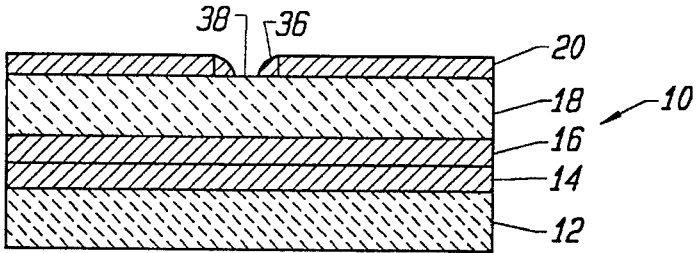
FIG. 6 is a cross-sectional view of the structure of FIG. 5 following anisotropic etching of the conformal layer, leaving spacers in the apertures at their edges on the top surface of the insulating layer.

It is seen in FIG. 6 that spacer 36 leaves an aperture 38 at the top of insulating layer 18. The size of spacers 36 is controlled to define the size of aperture 38, which can be, in one instance about 100 nm in width.

Figure 7:
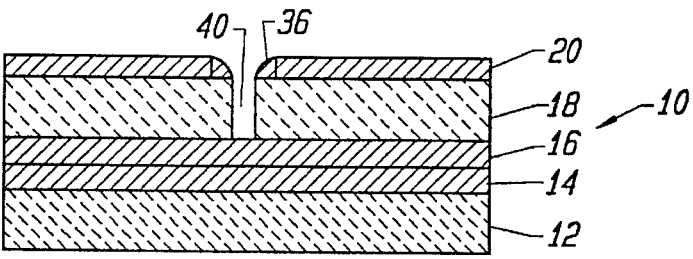
FIG. 7 is a cross-sectional view of the structure of FIG. 6 illustrating the use of the spacers as masks for reactive ion etching the insulating layer through the spacing over the insulating layer, to the resistive layer, and the formation of an insulating layer pore. The schematic of an electrochemical cell is also shown with an anode positioned over the gates, and the cathode connected to the metal row electrode and its associated resistive layer. The schematic also includes a voltage supply.

As shown in FIG. 7, spacers 36 are used as a mask for etching, e.g., a highly anisotropic selective etch in order to etch substantially only insulating layer 18 and form an insulating pore 40. Other structures are minimally etched. During the etch process, polymer is formed on the walls of insulating pores due to the use of $CH_4$ in the plasma. This forms a polymer on side and bottom walls of insulating pores 40. The polymer protects the walls from chemical attack but does not protect the walls from the energetic particles. Because the energetic particles come straight down and hit only the bottom of insulating pore 40, the polymer is removed only from the bottom of insulating pore 40 and not along the sidewalls. The walls are protected from chemical attack, and etching is only in a direction towards resistive layer 16 because of the anisotropic nature of the reactive ion etching. There is substantially no undercutting of insulating layer 18 because of polymer formation along the vertical walls of insulating pore 40 perpendicular to the plane of insulating substrate 12. Insulating pore 40 does not extend substantially into resistive layer 16. The control of limiting the etching of resistive layer 16 is accomplished with a variety of mechanisms, including but not limited to, (i) employing a selective etch that etches resistive layer 16 very slowly, (ii) determination of an end point when the etching will be completed by timing and the like, and (iii) monitoring to determine the point when resistive layer 16 begins to be etched.

Following reactive ion etching, it may be desirable to apply a chemical treatment on insulating pore 40 to remove the polymer. Suitable chemical treatments include but are not limited to, a plasma of $CF_4$ with $O_2$, or commercially available polymer strippers used in the semiconductor industry well known to those skilled in the art. Thereafter, an electrochemical cell is used, such as shown in FIG. 7.

Figure 8:
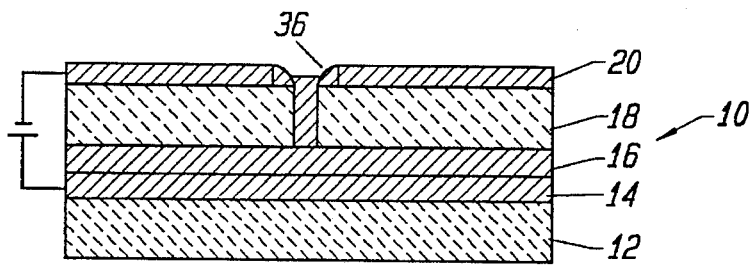
FIG. 8 is a cross-sectional view of the structure of FIG. 7 after the insulating layer pore has been filled with a filament material that extends through the insulating layer pore to a height generally not greater than the height of the spacers, creating the filament.

Referring now to FIG. 8, insulating pore 40 is then filled with a filament material. The plating extends into patterned gate 30. Suitable plating materials include but are not limited to Ni, Pt and the like. Plating can be achieved by pulse plating, with resistance layer 16 as the cathode, and an external anode. The voltage of resistive layer 16 and patterned gate 30 is controlled so that plating does not occur on metal gate layer 20.

Spacers 36 are subsequently removed with a removal process, including but not limited to selective plasma etching and wet etching. Thereafter, insulating layer 18 adjacent to filament 22 can be removed with an isotropic plasma or wet chemical (dilute HF) etch. The amount of insulating layer 18 removed is almost down to resistive layer 16.

Figure 9:
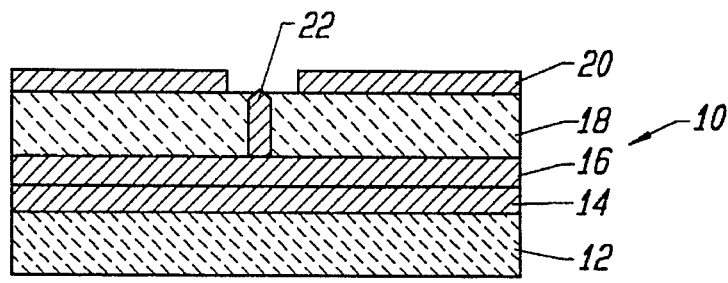
FIG. 9 is a cross-sectional view of a gated filament structure with a sharpened tip that can extend into the patterned gate.

Alternatively, insulating layer 18 is not removed (FIG. 9).

The use of spacers 36 along with reactive ion etching defines insulating pores 40 which are used to create filaments 22. An alternative process is to use tracking of the insulating layer 18 and chemical etching along the particle tracks.

With reference once again to FIG. 1, filament 22 is created and its tip preferably is between a top planar surface 41 of gate layer 20, and a bottom planar surface 43 of gate layer 20. In another embodiment, the filament tip is formed above planer surface 41. Less preferably, filament tip is formed below planar surface 43. The tip of filament 22 can be polished/etched to form a desired tip geometry.

Filaments 22 can have a variety of geometries such as flat topped cylinders, rounded top cylinders, sharp cones and the like, which can be created by polishing/etching.

Figure 10:
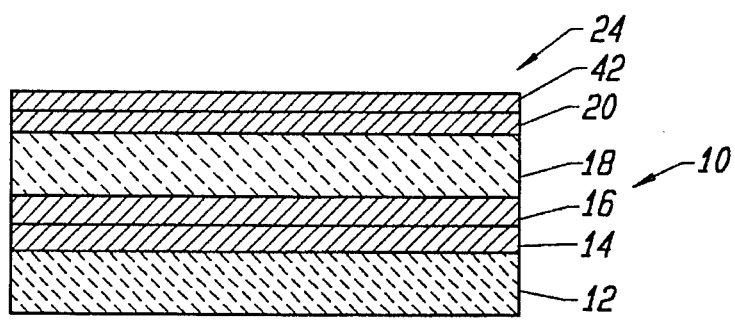
FIG. 10 is a second embodiment of the invention illustrating an initial multi-layer structure that includes a gate encapsulation layer positioned on a top surface of the metal gate layer and a tracking resist layer positioned on a top surface of the gate encapsulation layer.
Figure 18:
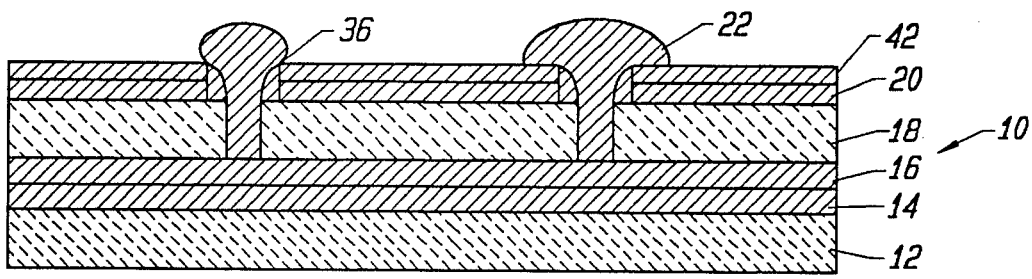
FIG. 18 is a cross-sectional view of the structure of FIG. 16. The relationship between the filament tip and the gate is still maintained even with nonuniformity of plating of the filaments.
Figure 19:
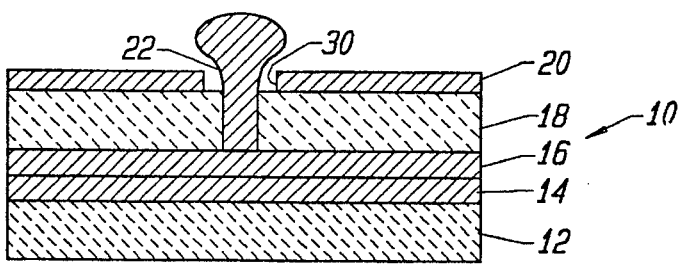
FIG. 19 is a cross-sectional view of a gated filament following removal of the gate encapsulation layer and the spacers. Also illustrated is a schematic of an electrochemical cell with the gate as the cathode, and the overgrown filament as the anode.
Figure 20:
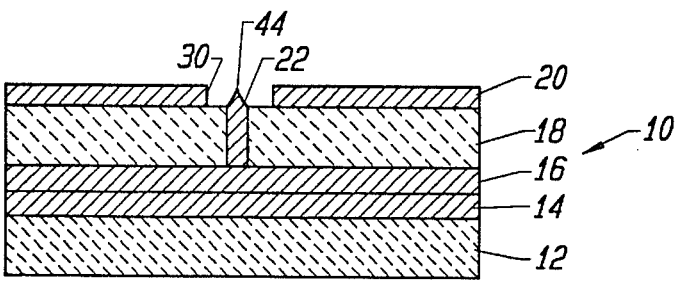
FIG. 20 is a cross-sectional view of the structure of FIG. 19 illustrating the creation of a gated sharpened filament.

If there are nonuniformities in the thickness of insulating layer 18, or nonuniformities in plating, another embodiment of the invention, illustrated in FIGS. 10 through 21, may be more suitable for producing filaments 22 with the same position relative to each respective gate 30, as more fully described hereafter. With reference now to FIGS. 10 and 20, filament 22 is formed above patterned gate 30 by the inclusion of a gate encapsulation layer 42. As shown in FIG. 20 patterned gate 30 is then used to define the point of filament 22, e.g., the tip geometry of filament 22, which allows for accommodation of non-uniformity in plating and non-uniformity in thickness of the dielectric. This defines the self-alignment of filament 22. Suitable gate encapsulation layer 42 materials include but are not limited to Si, $SiO_2$ and $Si_3N_4$.

The initial multi-layer structure is illustrated in FIG. 10 and includes a substrate 12, a metal row electrode 14 positioned on a top surface of substrate 12, a resistive layer 16 on a top surface of metal row electrode 14, an insulating layer 18 on a top surface of resistive layer 16, a metal gate layer 20 positioned on a top surface of insulating layer 18, a gate encapsulation layer 42 positioned on a top surface of metal gate layer 20 and optionally a tracking resist layer 24 positioned on a top surface of gate encapsulation layer 42. It will be appreciated that tracking resist layer 24 need not be included in this embodiment. The appropriate choice of material for gate encapsulation layer 42 may permit gate encapsulation layer 42 to be used also as the tracking resist layer. The only differences between the multilayer structure in the two embodiments is the inclusion of gate encapsulation layer 42, with or without tracking resist layer 24. Gate encapsulation layer 42 provides two functions, (i) it encapsulates patterned gate 30 and (ii) allows for the formation of taller spacers 36, permitting plating filament 22 above patterned gate 30.

Figure 11:
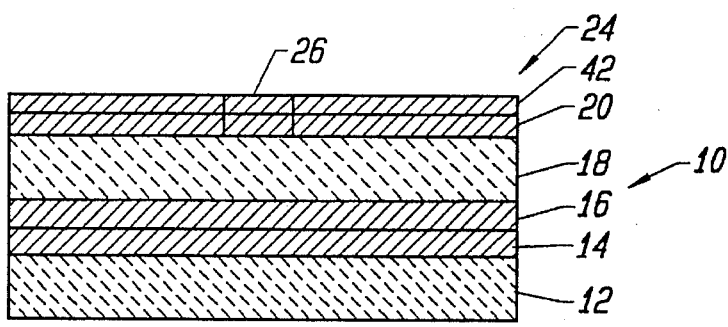
FIG. 11 is a cross-section view of the structure of FIG. 10 after the tracking resist layer has been etched to open up an aperture at the gate encapsulation layer.
Figure 12:
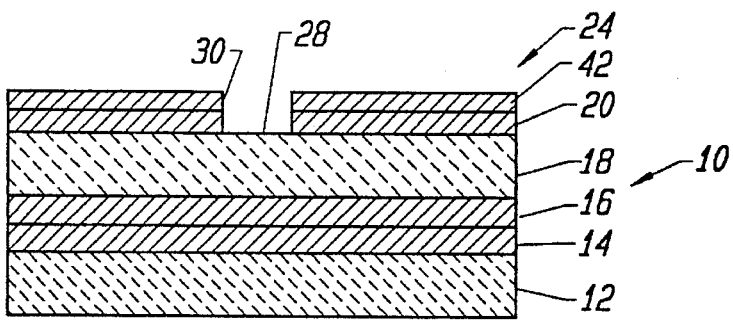
FIG. 12 is a cross-sectional view of the structure of FIG. 11 following reactive ion etching of the gate encapsulation layer and the metal gate, layer to create gates and apertures.

Particle tracking is utilized, as practiced in the first embodiment, and tracking resist layer 24 is etched (FIG. 11). A reactive ion etch through gate encapsulation layer 42 and gate layer 20 is performed (FIG. 12), creating gate hole 28 and patterned gate 30. Tracking resist layer 24 need not be included if gate encapsulation layer 42 can be tracked, etched and used as a resist for patterning gate 30. It will be appreciated that the same methods employed in the embodiment illustrated in FIGS. 1 through 9 are employed in this second embodiment, illustrated in FIGS. 10 through 21. The detailed descriptions of the multiplicity of steps utilized will not be repeated here.

Figure 13:
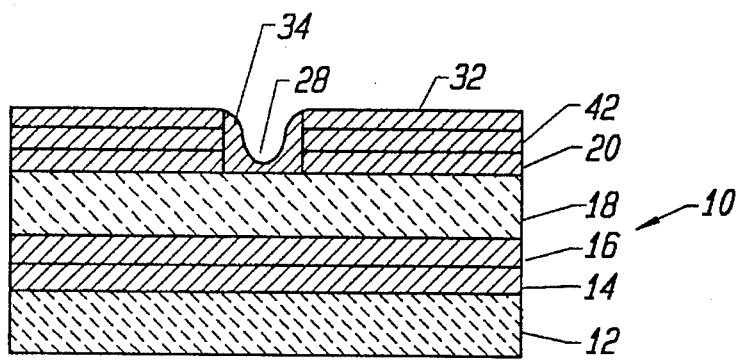
FIG. 13 is a cross-sectional view of the structure of FIG. 12 with a conformal layer applied on top of the gate and into the aperture.

Tracking resist layer 24, if included, is removed and a spacer conformal layer 32 is formed over gate layer 20 and into gate hole 28 (FIG. 13). With the proper selection of materials for gate encapsulation layer 42 and spacer conformal layer 32, gate layer 20 is completely insulated; therefore eliminating concerns regarding controlling voltage on patterned gate 30 to ensure that plating will not occur on patterned gate 30.

Figure 14:
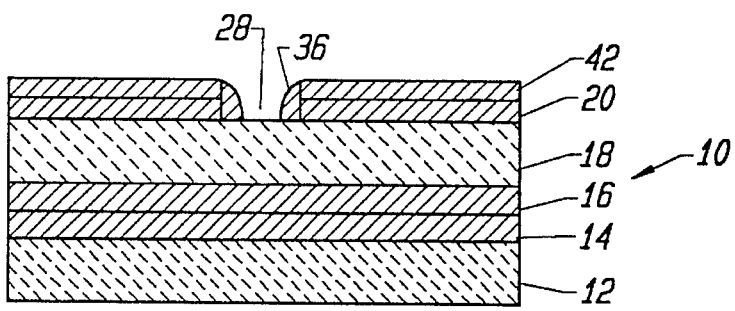
FIG. 14 is a cross-sectional view of FIG. 13 following anisotropic etching of the conforming member, leaving spacer material in the apertures at the edges of the patterned gate on the top surface of the insulating layer to form a plurality of spacers.
Figure 15:
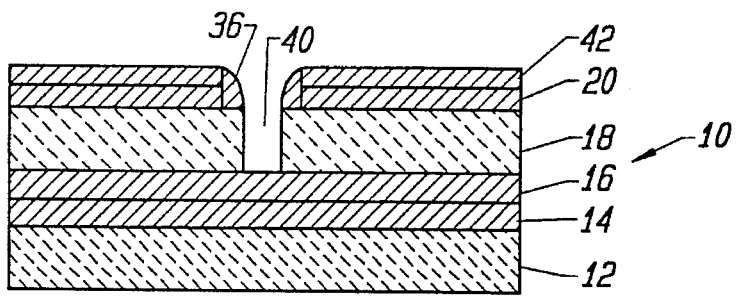
FIG. 15 is a cross-sectional view of the structure of FIG. 14 using the spacers as masks for etching the insulating layer through the spacing over the insulating layer to the resistive layer, and form an insulating layer pore. The schematic of an electrochemical cell is also shown with an anode positioned over the patterned gates, and the cathode connected to the metal row electrode and its associated resistive layer. The schematic also includes a voltage supply.

With the anisotropic etching of spacer conformal layer 32, the resulting spacers 36 have a height equal to the height of gate layer 20 plus encapsulation layer 42 (FIG. 14).

Figure 16:
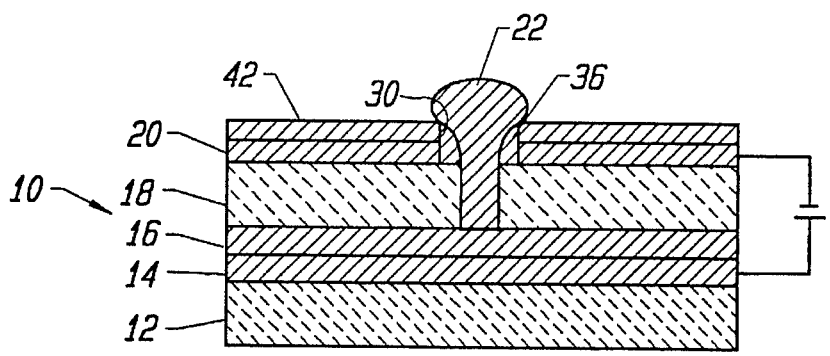
FIG. 16 is a cross-sectional view of the structure of FIG. 15 after the insulating layer pore has been filled with a filament material which extends through the insulating layer pore to a height above the gate.

Insulating pore 40 is formed (FIG. 15) and can have a width in the range of 50 to 1000 nm. A suitable width is about 100 nm. Insulating pore 40 is then filled (FIG. 16).

Figure 17:
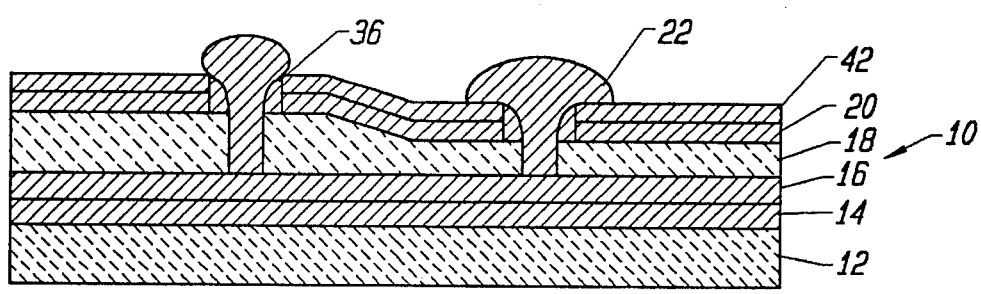
FIG. 17 is a cross-sectional view of a structure, similar to that of FIG. 16 except the thickness of the insulating layer is non-uniform. The relationship between the filament tip and the gate is still maintained even with the nonuniformity.

Referring now to FIGS. 17 and 18, the effects of nonuniformity of the thickness of insulating layer 18 of gated filament structure 10, and nonuniformity of plating are illustrated. Assuming that all insulating pores 40 fill at the same rate, then where insulating layer 18 is thin, insulating pores will be filled more quickly and there will be overplating (FIG. 17). Due to plating nonuniformity some insulating pores 40 will fill faster than others (FIG. 18). It is difficult to achieve uniformity of plating, particularly in large field emission displays because it is arduous to build suitable equipment to achieve uniform plating. The requirements of such equipment are that it provides, (i) uniform current density and (ii) efficiently stirs the electrolyte to avoid concentration gradients and depletion of the electrolyte. In any event, even with these nonuniformities, the relationship between filament 22 and its respective gate aperture 28 is maintained, as more fully described hereafter.

Conformal layer 32 and spacers 36 are removed, leaving a filament 22 that extends beyond patterned gate 30. (FIG. 19). Patterned gate 30 can be used to electro-polish filament 22 with the circuitry illustrated in FIG. 19. Thus, patterned gate 30 is used to define the point where a tip 44 of filament 22 will be (FIG. 20). Patterned gate 30 serves as the cathode for the electro-polishing. A suitable electrolyte is well known to those skilled in the art. This essentially pinches off filament 22 so that excess material becomes free and can be washed away. The remaining filament 22 has a tip 44 geometry that is sharp.

Tip 44 of filament 22 is now located at the position of patterned gate 30.

Figure 21:
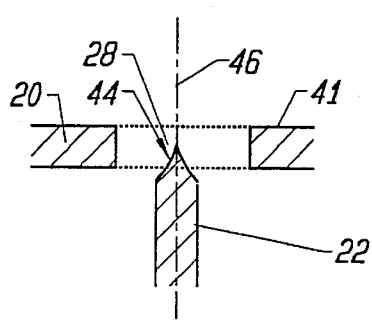
FIG. 21 is a cross-sectional view of the filament positioned in its aperture.

Filament 22 and filament tip 44 are positioned in gate aperture 28 to establish a relative position for filament tip 44 with its associated gate aperture 28. Referring now to FIG. 21, the relative position of filament tip 44 to its associated gate aperture 28 is defined as the position of tip 44 relative to a top planar surface 41 of gate layer 20 and a bottom planar surface 43 of gate layer 20.

Metal gate layer 20 has an average thickness "s" and a top metal gate planar surface $20(a)$ that is substantially parallel to a bottom metal gate planar surface $20(b)$. Metal gate layer 20 includes a plurality of pores 40 extending through metal gate 30. Each pore 40 has an average width "r" along a bottom planar surface of the aperture. Each pore defines a midpoint plane 46 positioned parallel to and equally distant from top metal gate planar surface $20(a)$ and bottom metal gate planar surface $20(b)$. A plurality of filaments 22 each have a filament tip 44 which terminates at a point "A" and a filament axis 48 that extends along a length of the filament through filament tip 44. At the intersection of filament axis 48 and midpoint plane 46, a point "O" is defined. A majority of all filament tips 44 of the display have a length "L" between each filament tip 44 at point A and point O along filament axis 48, where, $$L \leq (s+r)/2.$$

Preferably, at least 75% of all filament tips 44 have this relationship between point A and point O, more particularly, it is at least 90%.

The majority of filament tips 44 of the display can have, (i) point A above top metal gate layer planar surface $20(a)$, (ii) point A between top metal gate layer planar surface $20(a)$ and bottom metal gate layer planar surface $20(b)$, or (iii) point A below bottom metal gate layer planar surface $20(b)$.

With the method of the present invention every insulating pore 40 is overplated and vertical self-alignment is utilized. Patterned gate 30 is used to do the polishing/etching. With the inclusion of gate encapsulation layer 42 filament 22 is plated above patterned gate 30. Additionally, there may be more plating at the edges of the field emission display than in the middle. This can occur because of (i) current crowding effects and (ii) electrolytic depletion effects. As long as the plating is above patterned gate 30 in all places two advantages are achieved, (i) a tolerance on thickness uniformity of deposited insulating layer 18 is provided, and (ii) a high tolerance for the uniformity of plating is possible.

The result is the creation of filaments 22 for the field emission display and the position of each filament 22 is the same within each pore 40 (vertical alignment). Polished filament tips 44 can be created. Further, cones can be formed, as well as filaments using electroless deposition and selective deposition processes well known to those skilled in the art.

In another embodiment, the gate can be patterned and used as a mask to completely etch the insulating layer. The conformal layer is then deposited into the created pore. This can lead to complete encapsulation of the gate, making plating easier. Excess material formed on a bottom of the pore is removed with a suitable method including but not limited to plasma or wet etch. The pore is then overplated. Conformal layer is subsequently substantially removed chemically, and the desired filament tip is then electrochemically etched to created the desired geometry.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method of creating gated filament structures for a field emission display, comprising:

providing a multi-layer structure including a substrate, an insulating layer, a metal gate layer positioned on a top surface of the insulating layer and a gate encapsulation layer positioned on a top surface of the metal gate layer;

providing a plurality of gates defining a plurality of apertures on the top of the insulating layer, with corresponding apertures in the encapsulating layer;

forming a plurality of spacers in the apertures at their edges on the top surface of the insulating layer;

using the spacers as masks for etching the insulating layer and forming a plurality of pores in the insulating layer; and electrochemically plating the pores with a filament material and creating a plurality of filaments each having a substantially cylindrical body section.

2. The method of claim 1, wherein the multi-layer structure further comprises:

a conductivity layer positioned on a top surface of the substrate.

3. The method of claim 1, further comprising:

removing the spacers and the gate encapsulation layer.

4. The method of claim 1, wherein the multi-layer structure further comprises:

a metal row electrode positioned on a top surface of the substrate; and a resistive layer at least partially positioned on a top surface of the metal row electrode, with the insulating layer positioned on a top surface of the resistive layer.

5. The method of claim 4, wherein the multi-layer structure further comprises:

a tracking resist layer positioned on a top surface of the gate encapsulation layer.

6. The method of claim 5, further comprising:

irradiating the multi-layer structure with charged energy particles to produce a plurality of tracks in the tracking resist layer.

7. The method of claim 6, wherein forming the plurality of patterned gates comprises:

etching the plurality of tracks to form a plurality of apertures in the tracking resist layer; and etching the gate encapsulation layer and the metal gate layer to form a plurality of gates defining a plurality of apertures on the top of the insulating layer.

8. The method of claim 7, wherein forming the plurality of spacers comprises:

applying a spacer conformal layer on a top of the gates and into the apertures; and removing the spacer conformal layer while leaving spacer material in the apertures at their edges, on the top surface of the insulating layer, to form a plurality of spacers that define a spacing over the insulating layer.

9. The method of claim 8, wherein the spacer conformal layer is made of a material selected from silicon nitride, amorphous and small grained polycrystaline Si or $SiO_2$.

10. The method of claim 7, wherein the patterned gates are used to electro-polish the filaments tips.

11. The method of claim 5, wherein the tracking resist layer is made of polycarbonate.

12. The method of claim 4, further comprising:

establishing an electrochemical cell with the gates serving as a cathode, and the filament associated with a gate serving as an anode;

forming filament tips for the filaments of the display to establish a relative position for the filament tips of the display and their associated apertures, with each relationship being substantially the same for at least 50% of the filaments of the display.

13. The method of claim 12, wherein each relationship is substantially the same for at least 75% of the filaments of the display.

14. The method of claim 12, wherein each relationship is substantially the same for at least 90% of the filaments of the display.

15. The method of claim 12, wherein the tips of the filaments are sharpened.

16. The method of claim 4, wherein the metal gate layer is etched with a reactive ion etching which does not extend substantially into the insulating layer.

17. The method of claim 4, wherein the metal gate layer is etched with a reactive ion etching which etches the insulating layer at a slower rate than an etching rate of the metal gate layer.

18. The method of claim 1, further comprising:

removing a portion of the insulating layer adjacent to the filaments.

19. The method of claim 1, wherein substantially every pore is overplated.

20. The method of claim 1, wherein the gate encapsulation layer is made of silicon nitride.

21. The method of claim 1, wherein an anisotropic reactive ion etch is used to create the plurality of pores in the insulating layer.

22. A method of creating gated filament structures for a field emission display, comprising:

providing a multi-layer structure including a substrate, an insulating layer, a metal gate layer positioned on a top surface of the insulating layer and a gate encapsulation layer positioned on a top surface of the metal gate layer;

providing a plurality of gates defining a plurality of apertures on the top of the insulating layer, with corresponding apertures in the encapsulating layer;

forming a plurality of spacers in the apertures at their edges on the top surface of the insulating layer;

using the spacers as masks for etching the insulting layer and forming a plurality of pores in the insulting layer; and electrochemically overplating the pores with a filament material and creating a plurality of filaments each having a substantially cylindrical body section.

23. The method of claim 22, wherein the multi-layer structure further comprises:

a conductivity layer positioned on a top surface of the substrate.

24. The method of claim 23, further comprising:

establishing an electrochemical cell with a pair of gates serving as a cathode, and the filament associated with each pair of gates serving as an anode;

forming filament tips for the filaments of the display to establish a relative position for the filament tips of the display and their associated apertures, with each relationship being substantially the same for at least 50% of the filaments of the display.

25. The method of claim 24, wherein each relationship is substantially the same for at least 75% of the filaments of the display.

26. The method of claim 24, wherein each relationship is substantially the same for at least 90% of the filaments of the display.

27. The method of claim 24, wherein the tips of the filaments are sharpened.

28. The method of claim 22, further comprising:

removing the spacers and the gate encapsulation layer.

29. The method of claim 22, wherein the multi-layer structure further comprises:

a metal row electrode positioned on a top surface of the substrate; and a resistive layer at least partially positioned on a top surface of the metal row electrode, with the insulating layer positioned on a top surface of the resistive layer.

30. The method of claim 29, wherein the multi-layer structure further comprises:

a tracking resist layer positioned on a top surface of the gate encapsulation layer.

31. The method of claim 30, further comprising:

irradiating the multi-layer structure with charged energetic particles to produce a plurality of tracks in the tracking resist layer.

32. The method of claim 31, wherein forming the plurality of gates comprises:

etching the plurality of tracks to form a plurality of apertures in the tracking resist layer; and etching the gate encapsulation layer and the metal gate layer to form a plurality of gates defining a plurality of apertures on the top of the insulating layer.

33. The method of claim 32, wherein the patterned gates are used to electro-polish the filament tips.

34. The method of claim 30, wherein the tracking resist layer is made of polycarbonate.

35. The method of claim 22, further comprising:

removing a portion of the insulating layer adjacent to the filaments.

36. The method of claim 22, wherein the gate encapsulation layer is made of silicon nitride.

* * * * *

UNITED STATES PATENT AND TRADEMARK OFFICE
CERTIFICATE OF CORRECTION

PATENT NO. : 5,578,185
DATED : November 26, 1996
INVENTOR(S) : Bergeron, et. al.

It is certified that error appears in the above-identified patent and that said Letters Patent is hereby corrected as shown below:

Title page, item [63], under Related U.S. Application Data should read--
Continuation-in-part of Ser. No. 269,229, Jun. 29, 1994, Pat. No. 5,564,959"

Signed and Sealed this

Thirtieth Day of June, 1998

Attest:

BRUCE LEHMAN

Attesting Officer     Commissioner of Patents and Trademarks